US012356509B2

(12) United States Patent
Kachelhoffer

(10) Patent No.: US 12,356,509 B2
(45) Date of Patent: Jul. 8, 2025

(54) ELECTRIC HEATING DEVICE

(71) Applicant: Eberspächer catem GmbH & Co. KG, Herxheim (DE)

(72) Inventor: Patrick Kachelhoffer, Seebach (FR)

(73) Assignee: Eberspächer Catem GmbH & Co. KG, Herxheim (DE)

( * ) Notice: Subject to any disclaimer, the term of this patent is extended or adjusted under 35 U.S.C. 154(b) by 1088 days.

(21) Appl. No.: 17/321,935

(22) Filed: May 17, 2021

(65) Prior Publication Data

US 2021/0360744 A1 Nov. 18, 2021

(30) Foreign Application Priority Data

May 18, 2020 (DE) ..................... 10 2020 113 402.9

(51) Int. Cl.
*H05B 3/06* (2006.01)

(52) U.S. Cl.
CPC ......... *H05B 3/06* (2013.01); *H05B 2203/016* (2013.01); *H05B 2203/02* (2013.01); *H05B 2203/021* (2013.01)

(58) Field of Classification Search
CPC ................ H05B 3/06; H05B 2203/016; H05B 2203/02; H05B 2203/021; H05B 1/0236; H05B 3/24; H05B 3/50; H05B 2203/023
See application file for complete search history.

(56) References Cited

U.S. PATENT DOCUMENTS

| | | | | |
|---|---|---|---|---|
| 5,540,595 A * | 7/1996 | Bernitz | H05B 41/00 439/449 |
| 6,455,822 B1 | 9/2002 | Chang | |
| 2008/0000889 A1* | 1/2008 | Niederer | F24H 3/082 219/205 |
| 2008/0099464 A1* | 5/2008 | Niederer | F24H 3/0429 219/520 |
| 2011/0147370 A1* | 6/2011 | Bohlender | H05B 3/50 219/553 |
| 2016/0360573 A1* | 12/2016 | Bohlender | H05B 3/30 |
| 2016/0381790 A1* | 12/2016 | Markovsky | H05K 5/0078 361/759 |

(Continued)

FOREIGN PATENT DOCUMENTS

| | | |
|---|---|---|
| CN | 107206866 A | 9/2017 |
| EP | 1872986 | 1/2008 |

(Continued)

*Primary Examiner* — Tiffany T Tran
(74) *Attorney, Agent, or Firm* — Boyle Fredrickson, S.C.

(57) ABSTRACT

An electric heating device comprises a housing with a partition wall which separates a connection chamber from a heating chamber for dissipating heat and from which at least one heating rib protrudes in the direction toward the heating chamber and forms a receiving pocket. A PTC heating device is received in the receiving pocket and includes at least one PTC element and conductor tracks which are electrically connected in the connection chamber for energizing the PTC element with different polarities and which are connected to PTC element r in an electrically conductive manner. A profile member is provided between the PTC heating device and an inner side of the receiving pocket and is connected to the receiving pocket by way of a tongue and groove connection which extends in the direction of insertion of the receiving pocket.

15 Claims, 4 Drawing Sheets

(56) References Cited

U.S. PATENT DOCUMENTS

| | | | |
|---|---|---|---|
| 2018/0156493 | A1 | 6/2018 | Bohlender et al. |

FOREIGN PATENT DOCUMENTS

| | | | | | |
|---|---|---|---|---|---|
| EP | 2337425 | | 6/2011 | | |
| EP | 2397788 | | 12/2011 | | |
| EP | 2637474 | | 9/2013 | | |
| EP | 2440004 | | 2/2015 | | |
| EP | 3101365 | | 12/2016 | | |
| WO | WO-0234094 | A1 * | 5/2002 | ......... | A47G 27/0287 |

* cited by examiner

ELECTRIC HEATING DEVICE

BACKGROUND OF THE INVENTION

1. Field of the Invention

The present invention relates to an electric heating device comprising a housing with a partition wall which separates a connection chamber from a heating chamber for dissipating heat and from which at least one heating rib protrudes in the direction toward the heating chamber that forms a receiving pocket in which is received a PTC heating device, the PTC heating device including at least one PTC element and conductor tracks which are electrically connected in the connection chamber for energizing the PTC element with different polarities and which connected to the PTC element in an electrically conductive manner.

2. Background of the Invention

The PTC heating element has at least one PTC element and conductor tracks abutting thereagainst in an electrically conductive manner. The conductor tracks are connected to the PTC element in an electrically conductive manner. This connection can be a positive-fit and/or force-fit and/or positive substance-fit connection.

The aforementioned general features of the electric heating device apply to prior art according to EP 1 872 986 A1. They also apply to the implementation of the invention.

The earlier proposals EP 2 637 474 A1 and EP 2 337 425 A1, respectively, originating from the applicant each disclose PTC heating elements which are inserted into a previously mentioned receiving pocket.

EP 2 337 425 A1 discloses a solution in which a conductor track abutting against a main side surface of the PTC element is provided as a piece of sheet metal with contact projections bent out of the plane of the piece of sheet metal. The contact projections only serve to improve the electric contact of the PTC element.

In the previously known solutions described above, the receiving pocket tapers towards its lower closed end. Accordingly, the insertion opening that opens to the connection chamber is wider than the lower closed end of the receiving pocket. The PTC elements and the contact plates abutting thereagainst on both sides are typically braced in the receiving pocket with a wedge-shaped pressure element, with the interposition of at least one insulating layer between the conductor tracks and oppositely disposed inner surface of the receiving pocket. This wedge element ensures that the layers of the layer structure are abutted in a clamped manner against one another. These layers are at least the PTC element or elements and the conductor tracks extending at a right angle to the direction of force action of the wedge element, typically contact plates, and at least one insulating layer.

Despite the production-related cross-sectional shape of the receiving pocket conically tapering downwardly, the wedge element is to enable good heat transfer, preferably between the two mutually opposite heat extraction surfaces of the PTC element and the respective inner surfaces of the receiving pocket associated therewith with the interposition of the pressure element. Due to the pressure built up there, the oppositely disposed heat extraction surface of the PTC element is also abutted directly or with the interposition of an insulating layer against the oppositely disposed inner surface of the receiving pocket.

This ensures good heat extraction. However, there is the problem that the receiving pocket does not always correspond to the designed shape due to manufacturing tolerances.

The PTC elements are furthermore subject to certain dimensional fluctuations. It is also not always ensured that the heat extraction surfaces of the PTC element run completely straight and planar.

Pressing in a wedge as a pressure element can lead to stress peaks, due to which the PTC element or a ceramic insulating layer, respectively, can fracture inside the receiving pocket. Depending on the tolerances, the wedge element used as a pressure element in prior art in the specific application might not be thick enough, so that it basically sits without effect at the lower end of the receiving pocket. If, on the other hand, the free space remaining before the wedge element is introduced is too small, then this results in insufficient coverage of the heat extraction surface of the PTC element in the height direction of the receiving pocket, i.e. between the lower end and the insertion opening. As a result, the PTC element heats up too much and prevents further uptake of power current. Consequently, the degree of efficiency of the PTC element is poor.

SUMMARY

The present invention aims to provide an electric heating device of the kind mentioned at the outset which can compensate for manufacturing tolerances in an improved manner without significant impairment of the heat extraction from the PTC element.

To satisfy this object, the present invention proposes an electric heating device including a housing with a partition wall which separates a connection chamber from a heating chamber for dissipating heat and from which at least one heating rib protrudes in the direction toward the heating chamber that forms a receiving pocket. A PTC heating device is received in the receiving pocket. The PTC heating device includes at least one PTC element and conductor tracks that are electrically connected in the connection chamber for energizing the PTC element with different polarities, the conductor tracks being connected to the PTC element in an electrically conductive manner A profile member is provided between the PTC heating device and an inner side of the receiving pocket and is connected to the receiving pocket by way of a tongue and groove connection which extends in a direction of insertion of the receiving pocket.

This electric heating device is preferably an electric heating device for a motor vehicle. The housing is typically a housing that is formed to be suitable for heating a liquid medium and has inlet and outlet ports for this purpose, but otherwise seals the heating chamber. The partition wall typically separates the connection chamber from the heating chamber in a fluid-tight manner. An upper end of the PTC heating device extends through the partition wall. Several PTC heating devices are typically provided and protrude as heating ribs into the heating chamber. The end of the PTC heating device protruding into the connection chamber typically comprises contact strips which are electrically contacted in the connection chamber, for which purpose a contact device may be provided which combines the various PTC heating devices by grouping the contact strips to form heating circuits and is provided with contact strips which in the orientation of the contact strips of the PTC heating devices protrude into a populated printed circuit board. This populated printed circuit board controls the power current for heating the PTC heating device and typically forms a control device; cf. EP 2 440 004 A1 or EP 1 872 986 A1.

In the solution according to the invention, the heating rib is configured as a circumferentially closed receiving pocket which is only open to the connection chamber. The PTC heating device is inserted into the receiving pocket from this side. Like in the prior art described above, the receiving tab is shaped conically downwardly in the direction in which the PTC heating unit is inserted.

According to the present invention, a profile member is provided in the receiving pocket and between the PTC heating device and an inner side of the receiving pocket. This profile member is connected to the receiving pocket by way of a tongue and groove connection. The tongue and groove connection extends in the direction of insertion of the receiving pocket.

This means that, in a cross-sectional view transverse to the direction of insertion, at least one groove projects from the inner side of the receiving tab or a tongue is respectively provided on this inner side into which a tongue protruding from the profile member engages. In the case first mentioned, the profile member has a groove in which the tongue associated with the heating rib engages. The groove or the tongue, respectively, extends in the direction of insertion. When the profile member is inserted, typically together with the PTC heating device, the groove is forced into the associated tongue. Tongue and groove slide past one another in the direction of insertion and their longitudinal direction. The groove and/or the tongue can have resilient properties. This results in a certain tolerance compensation. The heat extraction from the PTC element up to the outer surface of the heating rib exposed in the heating chamber is effected via the tongue and groove connection.

It is therefore preferable to provide a plurality of tongue and groove connections at least between one of the main side surfaces of the PTC element and the oppositely disposed inner surface of the receiving pocket. In a cross-sectional view transverse to the direction of insertion, the largest extension of the PTC element is seen to be the main side surface of the PTC element. The PTC element is typically cuboid-shaped. The main side surface spans the width of the PTC element. In said cross-sectional view, the thickness of the PTC element runs at a right angle to the width. The direction of longitudinal extension of the PTC element or the PTC heating device, respectively, runs at a right angle to the plane spanned by the width and the thickness and basically in the direction of insertion. This direction of longitudinal extension corresponds to the direction in which the PTC heating device is inserted into the receiving pocket.

As mentioned above, the tongue and groove connection is able to compensate for certain manufacturing tolerances by deformation in the region of the tongue and groove connection. The typically plurality of tongue and groove connections between main side surfaces of the PTC element and the oppositely disposed inner surface of the receiving pocket maintains a good heat extraction from the PTC element.

The solution according to the invention then allows for a compensation for manufacturing tolerances without impairing the heat extraction from the PTC element.

According to a development of the present invention, a groove defining projection that defines the groove and/or a tongue projection that at least in part forms the tongue can be pivoted about an axis extending substantially in the direction of insertion. This pivotability is effected by at least one free-standing groove defining projection or a free-standing tongue projection. The respective projection can be connected to the receiving pocket or the profile member, respectively, by way of a relatively thin web. The pivot axis and the pivotability of the projection can be adjusted in a defined manner by way of the alignment and shaping of the web. The pivotability is generally at least resilient, possibly also plastic.

According to a development of the present invention, the profile member has a U-shaped receptacle for the PTC heating device. This receptacle typically accommodates the PTC element, the conductor tracks, and any insulating layers possibly provided which in particular directly or indirectly cover the main side surfaces of the PTC element.

The profile member can be an extruded profile member. It may be formed from aluminum. This makes it necessary to provide at least one insulating layer between the PTC element and an inner surface of the profile member, against which the PTC heating device abuts in a thermally conductive manner With regard to the most symmetrical heat extraction possible and uniform tolerance compensation, a possible aspect of the present invention proposes to provide tongue and groove connections between each main side of the PTC element and the oppositely disposed inner side of the receiving pocket. The respective tongue and groove connections are accordingly formed adjacent to the two main side surfaces of the PTC element.

With regard to good heat transfer between the profile member and the inner side of the receiving pocket, it is proposed according to a development of the present invention that at least one groove defining projection that defines the groove and/or at least one tongue projection that at least in part forms the tongue is formed to taper towards its free end in a wedge-shaped manner. The tongue projection and the surface of the groove defining projection interacting therewith are shaped in such a way that a planar abutment arises between the two. Due to the wedge shape, the resilient pivot motion of one of the projections is promoted during the joining process. The present invention also assumes that the receiving pocket may taper in a wedge-shape manner towards its lower closed end. In a corresponding manner, the tongue and groove connection can also be formed to be wedge-shaped in the direction of insertion, so that approximately the same overlap arises in the region of the tongue and groove connection in each cross-sectional plane transverse to the direction of insertion of the PTC heating device into the receiving pocket.

At least one groove defining projection that defines the groove and/or at least one tongue projection that at least in part forms the tongue may be formed integrally on the receiving pocket. This specification may also apply to the profile member which may be formed as an extruded profile and can have an integral hinge on the underside, so that oppositely disposed legs of the profile member are connected to one another opposite to the connection chamber. This reduces the number of elements to be handled.

According to a development of the present invention, at least one compression element is provided between the profile member and a main side surface of the PTC element. In the case of a U-shaped profile member, the compression element is provided within the profile member. A compression element may be provided between the two main side surfaces of the PTC element and the inner surfaces of the profile member. The compression member can be formed by a tongue formed from metal. The tongue typically extends in a cross-sectional view transverse to the direction of insertion over the entire surface of the main side surface. It may be provided between an inner surface of the profile member and an insulating layer which covers the PTC heating device on the outside.

According to a possible, curing adhesive is introduced into the receiving pocket. It is at least in part received in the tongue and groove connection and cured there. The PTC heating device and the profile member are secured in the receiving pocket by the adhesive. The adhesive can be plastic adhesive with good thermal conductivity. It can be, for example, silicone adhesive to which particles that conduct heat well, for example, aluminum oxide particles, have been admixed. The adhesive then also improves the heat dissipation from the PTC element. It goes without saying that the entire receiving pocket can be filled with adhesive. The adhesive may be an electrically insulating adhesive.

BRIEF DESCRIPTION OF THE DRAWINGS

Further details of the present invention shall arise from the following description of an embodiment in combination with the drawing, in which.

DETAILED DESCRIPTION

Figure 1:
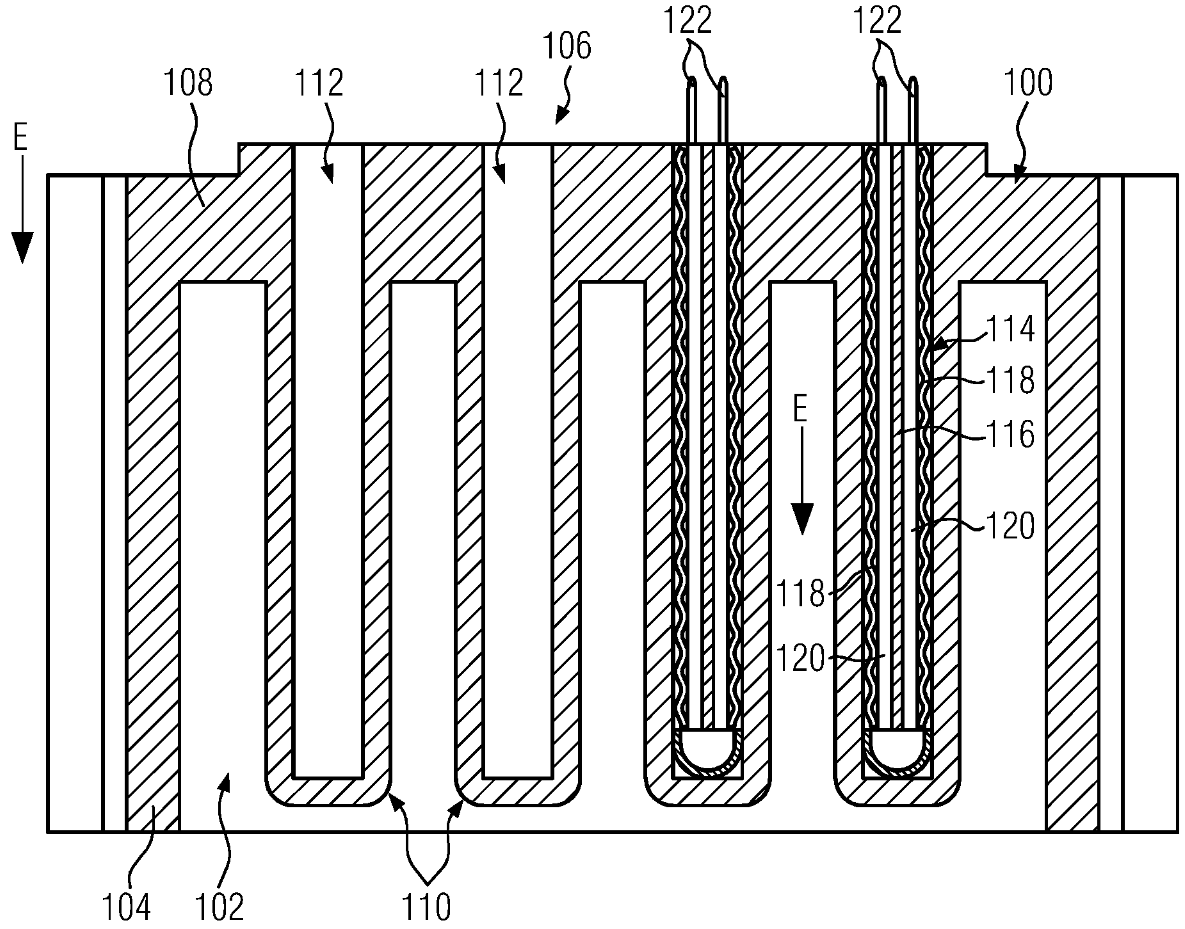
FIG. 1 shows a cross-sectional view of part of an electric heating device.

FIG. 1 shows the essential components of an electric heating device 100 with a housing 102 made of a material with good thermal conductivity, presently die-cast aluminum. The housing 100 forms a wall 104 circumferentially surrounding a heating chamber 102. In FIG. 1, the heating chamber 102 is still open on the underside since a base which closes the housing 100 on the underside is not illustrated in FIG. 1. The same applies to a control housing cover which is connected to the housing 100 on the oppositely disposed side for covering and surrounding a connection chamber identified with reference numeral 106. The housing 100 forms a partition wall 108 integrally between the heating chamber 102 and the connection chamber 106. Heating ribs 110 protrude from this partition wall 108 into the heating chamber 102. The heating ribs 110 are closed at their lower end that protrude into the heating chamber 102. As elucidated in FIG. 1, the heating ribs 110 are formed together with the partition wall 100 and the wall 104 from an integrally die-cast aluminum housing 100.

The heating ribs 110 form a receiving pocket 112 which tapers downwardly in a wedge shape. The PTC heating device identified with reference numeral 114 is received in this receiving pocket 112. As illustrated in the sectional view according to FIG. 1, the PTC heating device 114 comprises a PTC element 116, on the main side surfaces of which there are conductor tracks 118 which in the present case comprise a wire mesh made of electrically conductive material. An insulating layer 120 is present on the side of the conductor element 118 disposed opposite the PTC element 116 and can be formed by a ceramic layer and/or an insulating plastic film The gap between the insulating layer 120 and the PTC element 116 is overall filled by the conductor track 118. For this purpose, the free spaces between the wire mesh are filled with highly thermally conductive adhesive, which is part of the conductor track 118. The wire mesh projects beyond the PTC element to form contact strips 122 which are shown in FIG. 1. These contact strips 122 are exposed in the connection chamber 106. The PTC element 116 and the insulating layer 120 are joined to form a unit by the adhesion bonding of the conductor track 120. Compression elements 124 in the form of corrugated spring steel sheets that can be seen in FIG. 3 are disposed on the outer side of this PTC heating device 114.

Figure 2:
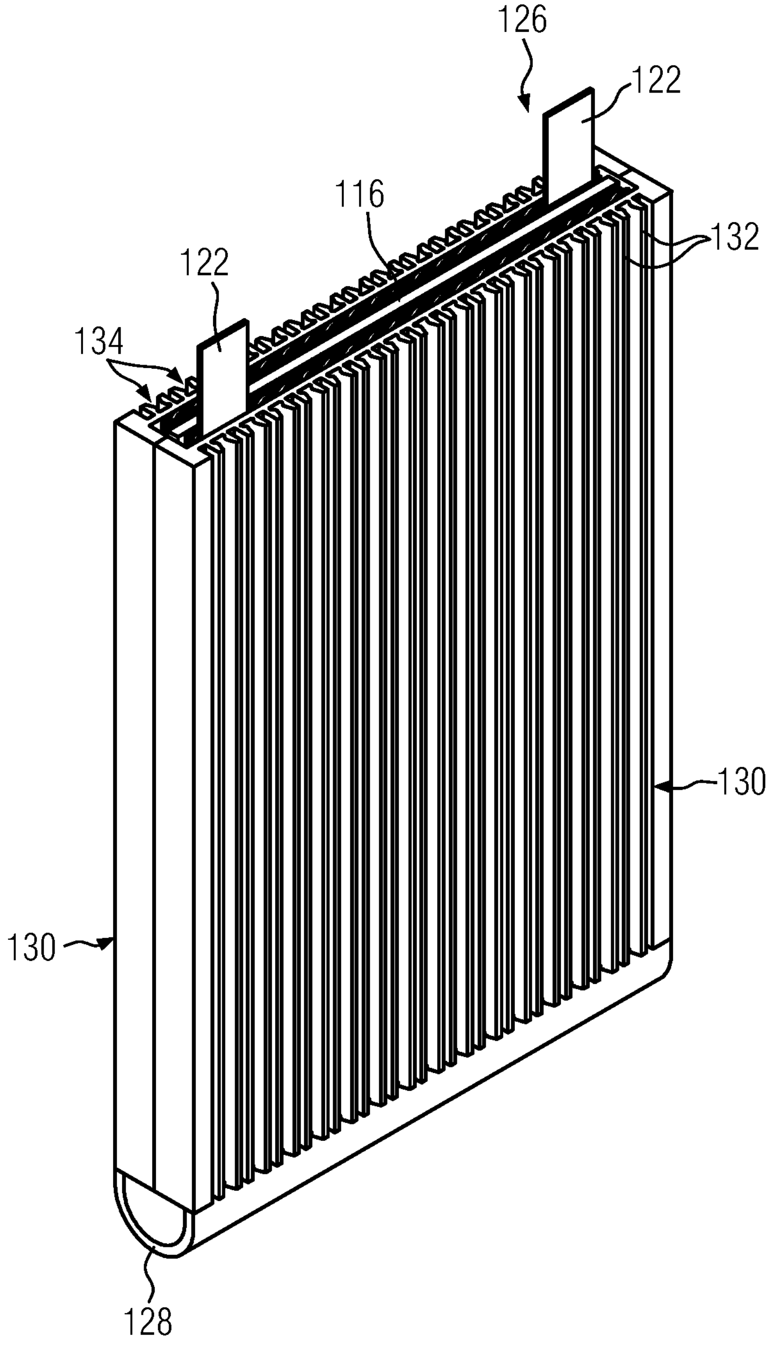
FIG. 2 shows a perspective side view of a profile member of the electric heating device according to FIG. 1.
Figure 3:
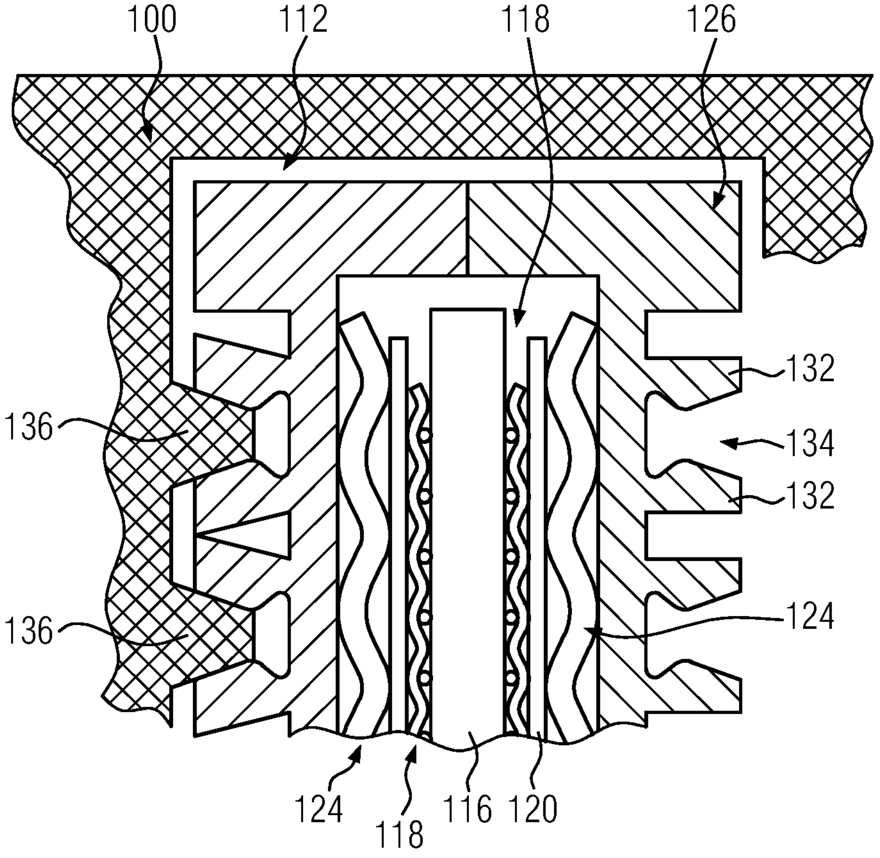
FIG. 3 shows a sectional view taken along line III-III according to the illustration in FIG. 1.

FIGS. 2 and 3 clearly show a profile member 126 which forms a U-shaped receptacle and comprises two side faces 130 connected by way of an integral hinge 128. The compression elements 124 abut against the inner side of this profile member 126 (cf. FIG. 3).

Respective groove defining projections 132, which in pairs each enclose a groove 134 between them, project from the oppositely disposed outer side of the side faces 130. As is illustrated in particular in FIG. 3, a plurality of identically configured grooves 134 are recessed in this form on the outer side of the side faces 130. The grooves 134 extend in the direction of insertion of the receiving pocket 112, which is identified as E in FIG. 1.

Tongue projections 136 again protrude from the inner side of the receiving pocket 112. These tongue projections 136 are integrally formed onto the die-cast housing 100. As is conveyed by the cross-sectional view according to FIG. 3, the tongue projections 136 taper towards their free end in a wedge shape. In a corresponding manner, the groove defining projections 132 are also configured to taper in a wedge shape towards their free front end. It goes without saying that only the surfaces of the groove defining projections 132 that respectively define the groove 134 have such a configuration. To elucidate this situation, the tongue projections 136 are omitted in FIG. 3 on the right-hand side.

In the embodiment shown in FIG. 3, the profile member 126 is first equipped with the PTC heating device 114 and the compression elements 126 during assembly. The assembly pre-assembled in this manner is thereafter inserted into the receiving pocket 112. The tongue projections 136 there engage in the grooves 134 associated with them. A deformation in the region of the groove defining projections 132 is evident from the comparison of the right-hand side to the left-hand side according to FIG. 3. It causes a certain tolerance compensation. The compression element 124 is additionally deformed for tolerance compensation. After successful assembly, the compression element 124 ideally abuts substantially over its entire surface, firstly, against the inner surface of the profile member 126 and, secondly, against the outer side of the insulating layer 120.

The compression element 124 can be made of aluminum, copper, copper beryllium, or some other material with good thermal conductivity that applies permanent resilient preload forces.

Remaining cavities in the receiving pocket 112 can be filled with a highly thermally conductive mass, for example, a curing plastic mass filled with thermally conductive particles.

Figure 4:
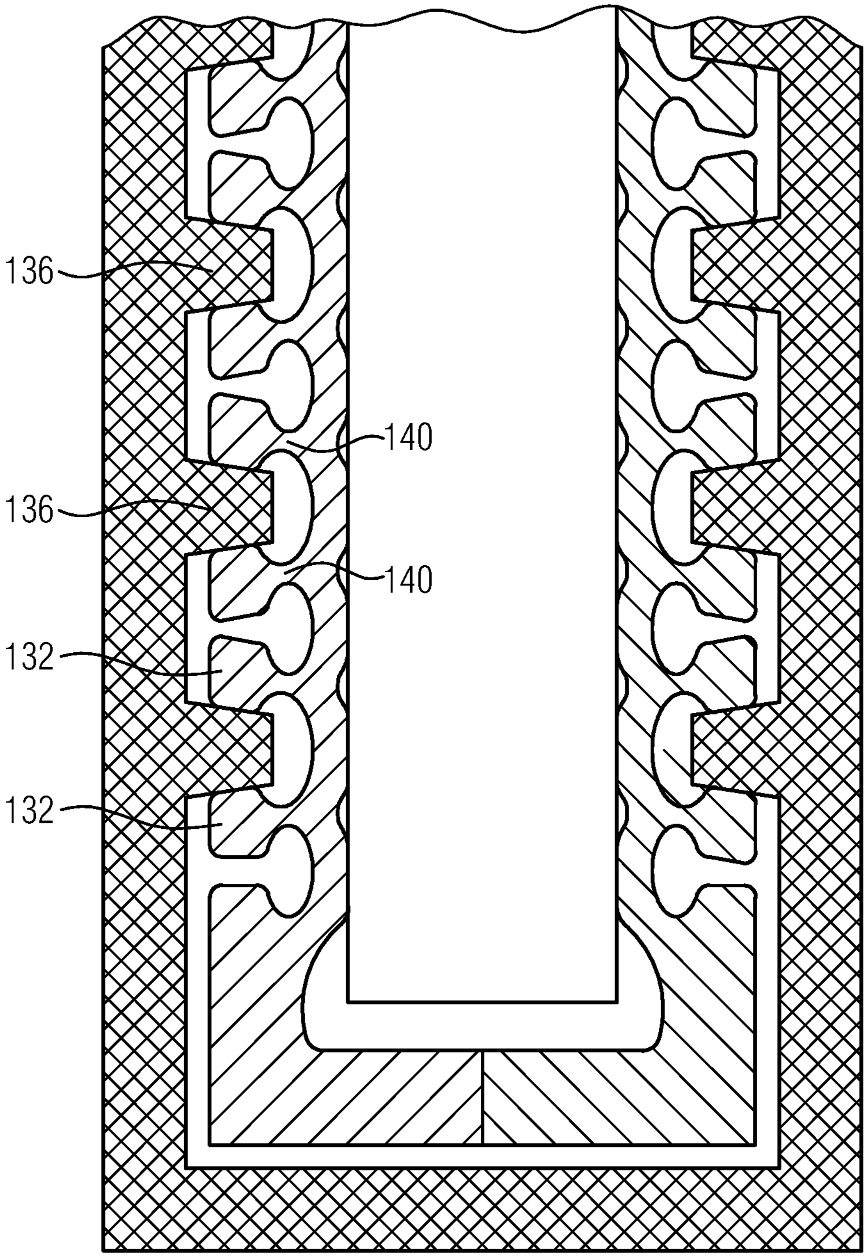
FIG. 4 shows a sectional view taken along line III-III according to the illustration in FIG. 1 for a variant of the profile member.

In the variant shown in FIG. 4, the groove defining projections 132 are connected to the remainder of the profile member 126 by way of a relatively thin web 140. This web 140 creates a pivot axis which extends substantially in the direction of insertion E. In this embodiment, compression elements can be dispensed with. Adjacent groove defining projections 132 for different grooves 134 are spaced sufficiently far from one another so that they can each pivot about their pivot axis without striking against one another when the wedge-shaped tongue projections 136 are introduced. This enables considerable tolerance compensation. The layers of the PTC heating device 114 within the profile member 126 are there applied with good resilient tension against the inner surface of the profile member 126, thereby improving heat extraction.

FIG. 4 also illustrates the bulging of the inner surface of the profile member 126 in such a way that, in a cross-sectional view, it abuts against the insulating layer 120 each substantially in a punctiform manner in the longitudinal linear direction. This deformation of the profile member 126 causes additional resilient tensioning of the PTC element 116 in the receiving pocket 112 as well.

The invention claimed is:

1. An electric heating device comprising:

a housing with a partition wall which separates a connection chamber from a heating chamber for dissipating heat, wherein at least one heating rib protrudes from the partition wall in a direction toward the heating chamber and forms a receiving pocket;

a PTC heating device received in the receiving pocket, the PTC heating device including at least one PTC element and conductor tracks that are electrically connected in the connection chamber for energizing the PTC element with different polarities, the conductor tracks being connected to the PTC element in an electrically conductive manner, wherein a profile member is provided between the PTC heating device and an inner side of the receiving pocket and is connected to the receiving pocket by way of a plurality of tongue and groove connections which extend in a direction of insertion of the receiving pocket and which effect heat extraction from the PTC element up to an outer surface of the heating rib.

2. The electric heating device according to claim 1, wherein the profile member forms a U-shaped receptacle that opens towards the connection chamber for the PTC heating device.

3. The electric heating device according to claim 1, wherein the PTC element has main side surfaces, and wherein the plurality of tongue and groove connections are provided between each main side surface of the PTC element and the inner side of the receiving pocket.

4. The electric heating device according to claim 1, wherein the PTC element has main side surfaces, and wherein the plurality of tongue and groove connections are provided between one of the main side surfaces of the PTC element and an inner surface of the receiving pocket.

5. The electric heating device according to claim 1, wherein at least one groove defining projection that defines the groove of the plurality tongue and groove connections is pivotable about an axis extending in the direction of insertion.

6. The electric heating device according to claim 1, wherein at least one tongue projection that at least in part forms a tongue of the plurality of tongue and groove connections is pivotable about an axis extending in the direction of insertion.

7. The electric heating device according to claim 5, wherein at least one tongue projection that at least in part forms a tongue of the plurality of tongue and groove connections is pivotable about an axis extending in the direction of insertion.

8. The electric heating device according to claim 1, wherein at least one groove defining projection that defines the groove of the plurality of tongue and groove connections is tapered towards a free end thereof and is in a wedge shape.

9. The electric heating device according to claim 1, wherein at least one tongue projection that at least in part forms a tongue of the plurality of tongue and groove connections is tapered towards a free end thereof and is in a wedge shape.

10. The electric heating device according to claim 8, wherein at least one tongue projection that at least in part forms a tongue of the plurality of tongue and groove connections is tapered towards a free end thereof and is in a wedge shape.

11. The electric heating device according to claim 1, wherein at least one groove defining projection that defines the groove of the plurality of tongue and groove connections is formed integrally on the receiving pocket.

12. The electric heating device according to claim 1, wherein at least one tongue projection that at least in part forms a tongue of the plurality of tongue and groove connections is formed integrally on the receiving pocket.

13. The electric heating device according to claim 11, wherein at least one tongue projection that at least in part forms a tongue of the plurality of tongue and groove connections is formed integrally on the receiving pocket.

14. The electric heating device according to claim 1, wherein at least one compression element is provided between the profile member and a main side surface of the PTC element.

15. The electric heating device according to claim 1, wherein curing adhesive is introduced into the receiving pocket and is at least in part received in one of the plurality of tongue and groove connections.

* * * * *